March 31, 1936.  H. GASTROW  2,035,801
CONTROL FOR DIE CASTING MACHINES FOR PLASTIC MASSES
Filed Dec. 10, 1934  2 Sheets-Sheet 2
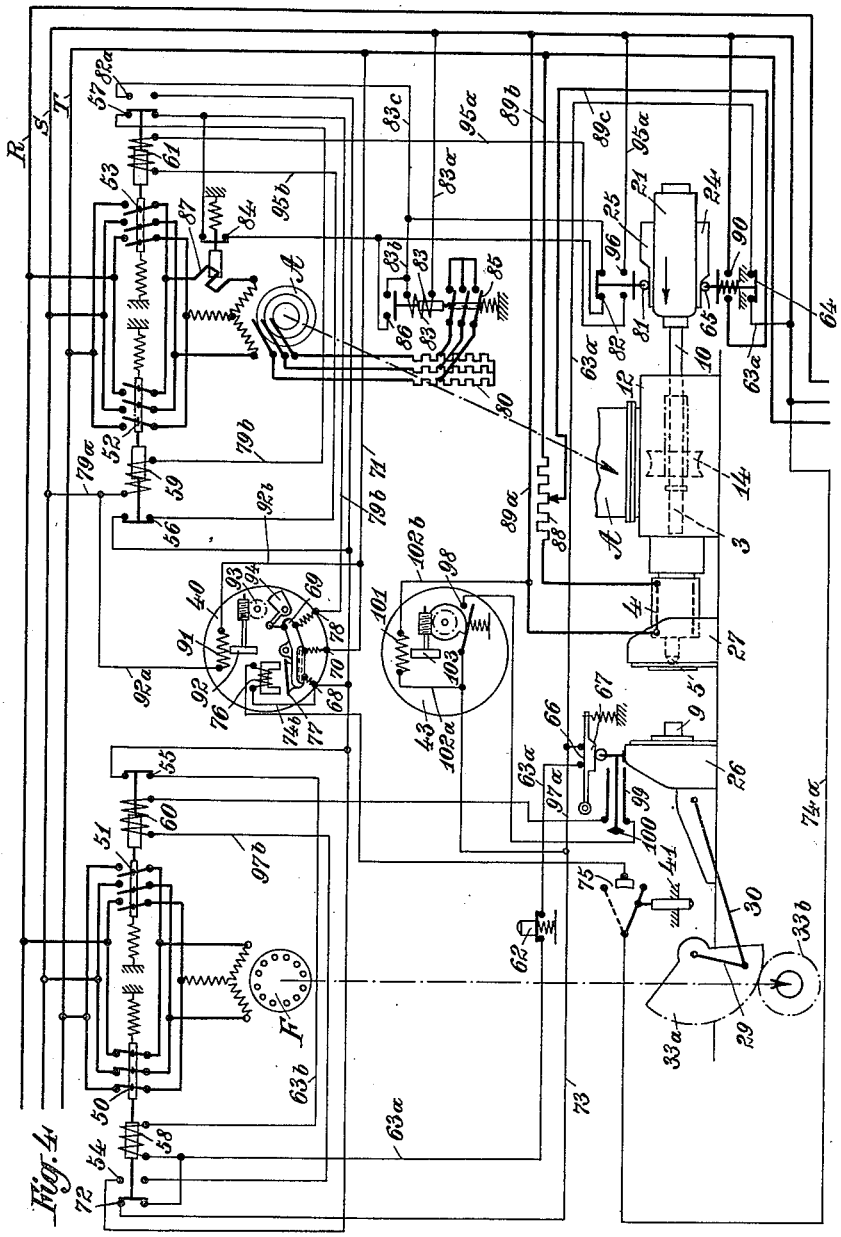
Inventor:
Hans Gastrow
By
Attorney Patented Mar. 31, 1936

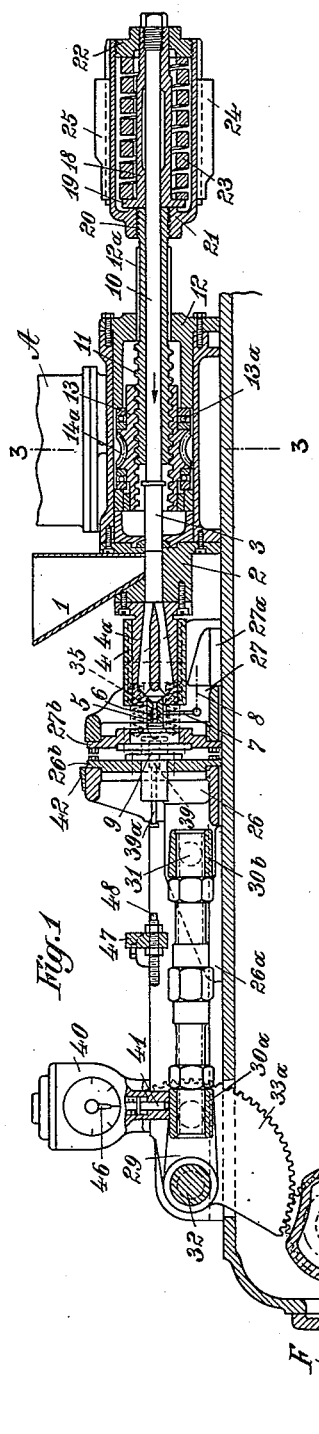

2,035,801

UNITED STATES PATENT OFFICE 2,035,801

CONTROL FOR DIE CASTING MACHINES FOR PLASTIC MASSES

Hans Gastrow, Zerbst in Anhalt, Germany

Application December 10, 1934, Serial No. 756,879
In Germany January 10, 1934

9 Claims. (Cl. 18—12)

This invention relates to installations for die casting plastic materials, more particularly those of the condensation product or synthetic resin type, the constituents of which are rendered more or less fluid by heat.

In my copending application Serial No. 701,229 there is described a machine for casting such plastic material with an electric drive in which the movement of the drive motor completely conforms with that of the injecting piston, which forces the heated material under high pressure through a nozzle into the mold, there being substantially synchronous movement of the motor and piston. The motor and piston come simultaneously to a standstill and the reciprocation of the injecting piston is obtained by reversing the rotation of the motor. In a drive of this kind the control of the motor is influenced by the movement of the injecting piston, as described in the said application. Control by the injecting piston can be obtained directly only in dependence on its travel, and to obtain control over those steps of the die casting operation during which no piston travel takes place, time relays are provided which are energized through contacts operated by the injecting piston.

An object of the present invention is to provide means whereby the movement of the injecting piston is also subject to control and timing by certain mold operations included in the functioning of the machine. Another object of the invention is to ensure that the opening and closing of the mold and its approach to and retraction from the injection nozzle of the machine, shall take place only in dependence upon the movement of the piston, or the duration of the compression in the mold.

A further object of the invention is to provide a complete automatic control system interlinking both the piston drive and the mold operating drive in an organized working cycle.

According to the invention the control of the motor and of the mold operating mechanism are mutually related mechanically and in timing and an electric motor is also employed for driving said mechanism.

In the drawings:

Figure 1 is a longitudinal section through the injection molding apparatus,

Fig. 2 is a plan view of the mold closing device,

Fig. 3 is a section along the line 3—3 of Fig. 1, and

Fig. 4 is the circuit arrangement of the automatic injection molding plant.

The injection molding device is shown on the right hand side of Fig. 1. 1 is the supply hopper and 2 the cylinder in which operates the injection piston 3. The heating cylinder 4a is provided with electric heating means 4. At its front end it is provided with a nozzle 5 equipped with a cock 6 which is actuated by way of a linkage 7 in dependence upon the position of the working piston 3 so that material is admitted to the mold only under predetermined conditions, namely during the actual injection stroke of the piston. Consequently there is no premature admission of the material into the mold and no wastage or leakage. The two part mold is indicated by 8.

The injection or working piston 3 constitutes a part of the piston rod 10 which is journaled in a hollow shaft 11 provided with a helical thread. The shaft 11 is slidable but is held against rotation in the housing 12 by means of keys 12a, the housing 12 also carrying a hollow shaft 13 which has a corresponding internal thread and is rotatably journaled by means of ball bearings 13a. The shaft 13 serves for driving the shaft 11 and is provided on its outside with a worm wheel 14a which is driven by means of a worm 14 which is secured on the shaft 15 of the driving motor A and is mounted in known manner in ball bearings 16.

In accordance with the direction of rotation the motor A rotates the hollow shaft 13 to the right or to the left by way of the gearing 14, 14a and thereby occasions a displacement of the shaft 11 in the longitudinal direction in one sense or the other. The transmission of the motion of the shaft 11 to the piston 10 is effected by way of an interposed spring 23 which is arranged in the housing 21. The housing 21 is rigidly secured to the shaft 11 by means of the thread 20. Screwed to the rod 10 is a tube 18 provided with a collar 19 and between the collar 19 and the cover 22 screwed into the housing 21 is located the spring 23 already referred to. The motion of the shaft 11 is thus in the first place transmitted to the housing 21 and thus to the collar 22 and then by way of the spring 23 to the collar 19, the tube 18 and thus to the piston rod 10. This construction of the drive corresponds to that described in my application for patent above referred to.

Provided on the spring housing 21 are cam elements 24, 25 which serve for controlling electric contacts which will be described subsequently.

The mold closing device shown on the left hand side of Fig. 1 consists of two mold carriages 26, 27 which by means of lateral lugs 26a, 27a are guided on rails 28a, 28b secured to the bed plate. The plates 26b and 27b which are screwed to the corresponding mold carriages serve for mounting the mold sections 9.

The mold carriage 26 is driven by way of a toggle lever which consists of a crank 29 and a rod 30. The rod 30 is threaded at both ends and is screwed into sleeves 30a and 30b. The sleeve 30b is pivotally mounted on a shaft 31 in the mold carriage 26 and the sleeve 30a is pivotally mounted on the crank 29 which is keyed to a shaft 32. The shaft 32 is journaled in the rails 28a, 28b and for driving the toggle linkage is provided with a toothed segment 33a which can be driven by the mould closing motor F by way of a worm gear 34a, 34b and a pinion 33b. The segment constitutes a part of the crank 29. The drawing shows the mold in the closed position.

The mold carriage 27 which in the known arrangements is not constructed as a slidable carriage but is fixed, is in accordance with the invention arranged to slide on the rails 28a and 28b. It is subjected to the action of four springs 35 which are arranged on either side of the carriage and are inserted in bores in the carriage. The other ends of the springs 35 abut against stops 36a, 36b on the rails 28a, 28b and tend to urge the mold carriage 27 away from the nozzle 5. The travel of the mold carriage in both directions is limited by means of stops, the motion to the right being limited by stops 37a, 37b and the motion to the left by threaded bolts 38b passing through the stops 36a and 36b.

The object of the springs 35 is to hold the mold closed during the withdrawal motion of the mold carriage 26 until the mold carriage 27 abuts against the front stops 38a and 38b. It is only from this moment that the mold itself commences to open. In this way the mold which has been filled and which is now to be cooled, is withdrawn from the injection nozzle 5. This is necessary as otherwise the material in the nozzle would also solidify due to the cooling.

Provided on a cross member 47 in the mold closing mechanism is an ejector 48 which occasions the ejection of the molded element from the mold. For this purpose a part of the section of the mold carried on the mold carriage 26 is replaced by a movable bolt 39 with an extension 39a against which the ejector 48 abuts on the rearward motion of the carriage 26. The molded element is ejected and falls into a collecting receptacle, which is not shown.

For controlling the electric operations a time switch 40 is provided which is actuated as soon as the toggle encounters an abutment 41. This time switch disconnects the motor F and applies control to the motor A. Also provided on the mold carriage 26 is a cam 42 which operates a switch contact, not shown, for reversing the direction of rotation of the motor F and for actuating a time switch 43 (Fig. 4) which again influences the motion of the motor F.

An extension 44 is provided on the shaft 32 to receive a lever 45 for effecting manual actuation of the mold closing device.

Fig. 4 shows the circuit arrangement of an injection molding plant in which all the working operations follow one another automatically. In this circuit arrangement, the devices in the injection molding apparatus which control electric contacts, are indicated at the bottom. The position shown indicates the working piston in the initial position and the mold in the open position. The element which has been molded has just been ejected.

Starting from this instant, the following working phases are obtained:

(1) Switching in the motor F of the closing device until the mold 9 is closed and the toggle lever engages the abutment 41 with simultaneous actuation of the time switch 40.

(2) Cutting out the motor F by the time switch 40 and switching in the motor A for rotation in the working direction, i. e. of the arrow shown in Fig. 4, after a time interval adjusted on the time switch 40 by means of a pointer 46.

(3) Switching over the working motor A to the reverse direction of rotation after the expiry of a time determined by the time switch and interrupting this motion by means of contacts which are controlled by the cam element 25.

(4) Switching in the motor F for rotation in the direction to open the mold at the end of the opening motion of the working motor A, by means of the cam element 24.

(5) Interrupting this motion by the time switch 43 for a time determined by this switch and reenergizing the motor F in the opening direction after the expiry of this time.

(6) Continuing the opening motion up to the cutting out of the motor F by means of a contact controlled by the mold carriage 26.

The arrangement shown in Fig. 4 serves for carrying out the switching operations necessary for the above mentioned phases of the working operation. A three-phase slip-ring armature motor is chosen for the motor A and a short circuited armature motor is chosen for the motor F; naturally direct current motors or three phase motors of other construction can be employed.

Both motors A and F can be connected to the three phase supply R, S, T by way of two arbitrarily operable magnetically actuated switches 50, 51 or 52, 53. By mutual locking by means of the contacts 54, 55 or 56, 57, it is ensured that only one of the switches can be switched in at any time for each motor. For switching on the motors in the forward direction, i. e., the closing direction for the motor F and the working direction of the piston 3 for the motor A, coils 58 and 59 are employed and the coils 60 and 61 are employed for the connection for the reverse directions. The coil 58 is thrown in by means of a press button 62 which when actuated gives rise to the following circuit when the apparatus is in the position shown.

From the phase S a current flows through the conductor 63a to the coil 58. In series in this conductor are the contacts 64 which in the position shown are closed by the switch device 65 controlled from the cam element 24, the contacts 66 and the press button 62. The contacts 66 are controlled by the cam 42 of the mould carriage 26 by way of a switch device 67. From the coil 58 the current flows through the conductor 63b by way of the contacts 55 to a contact 68 disposed in the time switch 40. The contact 68 is connected with the contact 70 by means of the mercury switch 69 and is connected with the phase T of the three phase supply by means of the conductor 71.

Thus by pressing the button 62 current is supplied to the coil 58, the motor F is energized and closes the mould. After a short motion of the mould carriage 26 the conductor is interrupted at 66. In the meantime, however, by actuating the switch 50 the contacts 72 have been closed whereby by means of the conductor 73 the contact 66 and the press button 62 are bridged. Consequently after being depressed for a short time the press button 62 can be released without causing the motor F to be arrested.

When the toggle lever abuts against the stop 41 there is a brief closure of the contact 75 in the conductor 74. Thereby the magnet coil 76 of the time switch 40 receives current from the phase S which can flow over the conductor 74b to the contact 68 and in the position of the switch 69 which is shown in the drawings and still persists at this time, to the phase T. Due to the attraction of the armature 77 the mercury switch 69 is tilted and the contacts 70 and 78 are then interconnected by the mercury. The coil 58 is deenergized and the motor F is cut out.

The current then flows from the phase S through the conductor 79a to the coil 59, through the conductor 79b by way of the contacts 57, 78 and 70 and through the conductor 71 to the phase T. The switch 52 is thrown in and the motor A is energized.

During the starting of the motor A only a part of the resistance 80 is included in the rotor circuit of the motor. The switching device 81 controlled from the cam element 25 closes in the initial position the contact 82. After the reversal of the mercury switch, a current flows from the phase S by way of the conductor 83a to the coil 83 and from thence by way of the conductor 83b via the contact 82 and further via the contact 84 to the conductor 79b and further by way of the contacts 78, 70 and conductor 71 to the phase T. The coil 83 throws in the switch 85 and the motor A is now short circuited by way of a small part of the resistance 80. By throwing in the switch 85 the contacts 86 are short circuited and thus the contacts 82, which are opened after a short movement of the piston 3, are bridged. An interruption of the circuit of the coil 83 can now occur only by opening the contact 84. This occurs when the motor current flowing through the coil 87 exceeds a certain magnitude. In this case the switch 85 is released and the motor is short circuited by way of the entire resistance 80. The resistance 80 is so dimensioned that adequate pressure is still exerted on the element which has already been injection molded.

The injection cylinder is continuously heated by the heating body 4 which is connected to the phases S and T by way of the resistance 88 and the conductors 89a and 89b. Towards the end of the injection operation an increased heating is effected by short circuiting a part of the resistance 88. This is effected by way of the conductor 89c which short circuits a part of the resistance 88 by means of the switch device 65 by bridging the contacts 90.

The end of the forward motion of the working piston is controlled by the time switch 40. In the time switch is located an induction motor the coil of which is indicated by 91 and the armature of which is indicated by 92. The coil 91 is continuously connected with the phases S and T by means of the conductors 92a, 92b and 71. The armature 92 runs at constant speed and drives a gear wheel 93 by way of a worm. By the attraction of the armature 77 a toothed segment 94 is brought into engagement with the gear wheel 93 and after a predetermined adjustable interval is again disengaged by the motion of the gear wheel 93. Simultaneously the mercury switch 69 is tilted downwardly. The connection of the contacts 70 and 78 is interrupted. The coil 59 is deenergized and the motor A is cut out.

At the same time the coil 61 is energized by the following circuit.

The current flows from the phase S through conductor 95a by way of contacts 96, which are now closed by the switch device 81, to the coil 61 and thence through the conductor 95b by way of the contacts 56 and contacts 68, 70 to the conductor 71 and thus to the phase T. The coil 61 throws in the switch 53, the motor A runs in the opposite direction and returns the piston 3 to the initial position. In this position the circuit is again interrupted by opening the contacts and the motor A is brought to rest.

Shortly after the commencement of the rearward motion of the piston 3, the contacts 90 are interrupted by the switch device 65 and thus the increased heating is switched off.

In order in the return motion to be able to throw in the resistance 80 again, a conductor 83c is provided which allows a current to flow through the coil 83 by way of the contacts 82a which are closed at this moment.

By means of the switch device 65 the contacts 64 are bridged at the commencement of the return motion of the piston, a current then flows through the conductors 63a, 97a by way of the contacts 98 in the time switch 43 through the contacts 99 to the coil 60 and from thence through the conductor 97b by way of the contacts 54 to the contact 68 of the mercury switch 69. At this moment the contact 68 is connected with the contact 70 so that the current passes by way of the contact 70 through the conductor 71 to the phase T. The contacts 99 are short circuited shortly after the commencement of the closing motion by means of a switch device 100 which in the same way as switch device 67 is controlled by the contact cam 42 of the mold carriage 26. As is apparent from the form of the contact, this connection is maintained during the remaining closing motion and during the greater part of the opening motion.

Disposed in the time switch 43 similarly to the time switch 40, is an induction motor, the coil 101 of which is continuously connected with the phases S and T by way of the conductors 102a and 102b. The armature 103 of the motor drives a gear wheel by way of a worm and thereby drives a cam. After a short motion this cam interrupts the circuit of the coil 60 so that the rearward motion of the mold carriage 26 is arrested, this occurring shortly before the mold carriage 27 engages the screws 38b serving as an abutment. In this position the mold remains closed but is however separated from the nozzle 5. The molded element can be cooled without any risk of the material in the mouth of the nozzle becoming solid. The mold carriages remain in this position until after the expiry of an adjustable period, the contacts 98 are again short circuited under the action of a spring. The coil 60 is again energized. The motor F is switched in in the opening direction and the motion continues until the contacts 99 are separated by the switch device 100. The opening of the mold occurs as soon as the mold carriage 27 abuts against the front stops 38b.

Shortly before the end of the rearward motion of the mold carriage 26 the abutment 48 engages the pin 39a. The movable part of the mold is urged forwardly and thereby the molded element is ejected from the opened mold. It falls by way of an inclined chute into the collecting receptacle (not shown). The injection molding device is now in the initial position and the working operations described above are repeated as soon as the press button 62 is depressed.

I claim as my invention:

1. An electro-mechanical installation for die casting plastics comprising, a mold adapted to be opened and closed, mold operating mechanism, an electric motor for driving the mold operating mechanism, an injection piston adapted to force the plastic into the mold, an electric motor for driving said piston, and a control system for both said motors having means operated directly from piston movement for controlling the piston motor, means with time delay from piston movement for controlling the piston motor, means operated in mechanical and timed dependency on the mold operating mechanism for controlling the piston motor, means operated from piston movement to control the mold drive motor, and means operated from the mold operating mechanism for controlling said mold drive motor.

2. An installation according to claim 1, in which means are provided in the control system operative to stop the mold drive motor when the mold is in closed position and also to start the piston motor with a predetermined time delay and to reverse said motor at the end of the injection stroke of the piston, means for varying the timing of said movements of the piston, and means in the control system for stopping the piston motor after the piston returns to initial position.

3. An electro-mechanical installation according to claim 1, in which means are provided in the control system operative after the beginning of the return stroke of the piston for starting the mold drive motor in the direction to open the mold, means in said system for producing an interruption of adjustable duration in the mold opening movement, means in said system operated by the mold operating mechanism for stopping the mold motor at the end of the opening movement, and means effective prior to said stoppage for ejecting a casting from the mold.

4. An electro-magnetic installation for die casting plastics comprising an injection nozzle, a mold adapted to be opened and closed, said mold having a driven member cooperating with a member slidable relatively to the nozzle, stops defining the limits of sliding of said last mentioned member, spring means between the mold members, a toggle mechanism connected to the driven member and adapted to apply the mold in closed position to the nozzle against the action of said spring means, an electric motor for driving the toggle mechanism, an injection piston adapted to force the plastic through the nozzle, an electric motor for driving said piston, and a control system for said motors having means operated directly from piston movement for controlling the piston motor, means operated with time delay from piston movement for controlling the piston motor, means operated in mechanical and timed dependency upon the mold operated mechanism for controlling the piston motor, means operated from piston movement for controlling the mold drive motor, and means operated from the driven member of the mold for controlling the mold drive motor.

5. An installation according to claim 4, in which the toggle mechanism includes a crank, a connecting rod jointed to the driven mold member, and a toothed sector on the crank, said sector being geared to the mold operating motor.

6. An installation according to claim 4, in which an ejector plunger is arranged in the driven mold member cooperating with a fixed stop for actuating the plunger to eject a casting from the mold.

7. An installation according to claim 1, in which the piston drive motor has a rotor with a variable resistance in the rotor circuit, and in which means are included in the control system for automatically increasing said resistance towards the end of the injection stroke of the piston.

8. An electro-mechanical installation according to claim 1, in which a heating circuit is associated with the mold, said circuit including a series resistance, and in which means are provided in the control circuit for automatically short circuiting a part of the said resistance towards the end of the injection stroke of the piston.

9. An electro-mechanical installation for die casting plastics comprising a mold adapted to be opened and closed, mold operating mechanism, an electric motor for driving the mold operating mechanism, an injection piston adapted to force the plastic into the mold, an electric motor for driving said piston, a control system for both said motors having means operated directly from piston movement for controlling the piston motor, means with time delay from piston movement for controlling the piston motor, means operated in mechanical and timed dependency on the mold operating mechanism for controlling the piston motor, and means operated from piston movement to control the mold drive motor.

HANS GASTROW.